(12) United States Patent
Chen et al.

(10) Patent No.: US 9,585,221 B1
(45) Date of Patent: Feb. 28, 2017

(54) LED LIGHT SOURCE AND CIRCUIT FOR DRIVING THE SAME

(71) Applicant: CHANGZHOU LUMIXESS TECHNOLOGY CO., LTD, Changzhou, Jiangsu (CN)

(72) Inventors: Zhong Chen, Shanghai (CN); Xiao Sun, Shanghai (CN)

(73) Assignee: CHANGZHOU LUMIXESS TECHNOLOGY CO., LTD, Changzhou, Jiangsu (CN)

( * ) Notice: Subject to any disclaimer, the term of this patent is extended or adjusted under 35 U.S.C. 154(b) by 0 days.

(21) Appl. No.: 15/056,434

(22) Filed: Feb. 29, 2016

(30) Foreign Application Priority Data

Oct. 30, 2015 (CN) .......................... 2015 1 0731552

(51) Int. Cl.
*H05B 33/08* (2006.01)

(52) U.S. Cl.
CPC ..... *H05B 33/0884* (2013.01); *H05B 33/0815* (2013.01); *H05B 33/0842* (2013.01)

(58) Field of Classification Search
CPC ............ H05B 33/0815; H05B 33/0809; H05B 33/0803; H05B 33/0851; H05B 33/0818; H05B 41/2828; H05B 33/0884; H05B 33/0842; H05B 37/02; Y02B 20/346

USPC .......................... 315/294, 307, 224, 312, 360
See application file for complete search history.

(56) References Cited

U.S. PATENT DOCUMENTS

| | | | |
|---|---|---|---|
| 6,936,968 B2* | 8/2005 | Cross ................. | H05B 33/0803 313/21 |
| 9,295,117 B2* | 3/2016 | Acatrinei ........... | H05B 33/0815 |
| 2012/0161666 A1* | 6/2012 | Antony .............. | H05B 33/0809 315/294 |

* cited by examiner

*Primary Examiner* — Haissa Philogene
(74) *Attorney, Agent, or Firm* — Merchant & Gould P.C.

(57) ABSTRACT

A circuit for driving a Light-Emitting Diode (LED) light source is provided. The circuit includes a bridge rectifier, a switch unit, a current detection unit and a logic control unit. When the arcing occurs, the current detection unit detects a current signal flowing through the set of light emitting diodes; the logic control unit is adapted for generating a corresponding control signal according to the current signal, so as to control the switch unit to switch off a path from which the set of light emitting diodes receive DC power. Thus, the arcing is eliminated or suppressed, and arcing protection is achieved. Further, after the arcing protection, the LED light source can be restarted by the circuit. A LED light source is also provided. The LED light source includes the above circuit.

20 Claims, 6 Drawing Sheets

LED LIGHT SOURCE AND CIRCUIT FOR DRIVING THE SAME

CROSS-REFERENCE TO RELATED APPLICATIONS

The present application claims priority to Chinese patent application No. 201510731552.4, filed on Oct. 30, 2015, and entitled "LED LIGHT SOURCE AND CIRCUIT FOR DRIVING THE SAME", the entire disclosure of which is incorporated herein by reference.

TECHNICAL FIELD

The present disclosure generally relates to Light-Emitting Diode (LED) light source technology, and more particularly, to a LED light source and a circuit for driving the same.

BACKGROUND

In the lighting field, LED light sources have been widely used, attributed to their advantages such as high luminous efficiency, long lifetime, low cost, etc. Fluorescent lamps, as traditional light sources, are gradually replaced by LED light sources. In the process of replacing a fluorescent lamp with a LED light source, a driving circuit of the LED light source is always required to obtain power from an electronic ballast, such that the LED light source can be compatible with the electronic ballast of the fluorescent lamp, and the old fluorescent lamp can be easily replaced and updated by a LED light source.

A working principle of the electronic ballast is described as follows. The electronic ballast generates a voltage having a peak higher than 500V to breakdown the fluorescent lamp in the early start, and establishes a discharge channel therein. Then, the electronic ballast maintains an arc in the discharge channel with a constant current. Further, when the fluorescent lamp is disconnected and reconnected, the electronic ballast can generate a high voltage to breakdown the fluorescent lamp once again. If a lamp cap of the fluorescent lamp is not properly installed in a lamp holder, or poor contact between the lamp cap and the lamp holder occurs in a working process, the electronic ballast may output a high voltage continuously. Because the lamp cap and the lamp holder are not well contacted, there is a large contact resistance between them. The high voltage may generate an arc between the lamp cap and the lamp holder, which is known as an arcing phenomenon. As a result, a high temperature is generated; the lamp cap and the lamp holder are deformed; and finally the fluorescent lamp may fall off from the lamp holder. In a serious case, surrounding combustible materials may be ignited and a fire may be caused. In the replacement of the fluorescent lamp with a LED light source, only the lamp is replaced, but the old lamp holder is stilled used. The old lamp holder usually has problems such as aging, wearing and surface oxidation of metal pieces. Thus, compared with a new lamp holder, the old lamp holder is more prone to having a problem of poor contact. As the LED light source usually has a plastic lamp cap, the high temperature generated by the arcing may easily deform the plastic lamp cap, resulting fall off of the LED light source and even a fire. Therefore, there is a need for protecting the LED light source from the arcing.

In the conventional technology, some electronic ballasts may have a protection circuit for preventing the arcing. The protection circuit detects a changing rate of an output current or an output power, so as to determine whether an arcing phenomenon occurs. The protection circuit can cut off the output of the electronic ballast or decrease the output current, so as to eliminate or suppress the arcing. When working with the fluorescent lamp, the protection circuit can eliminate and suppress the arcing effectively. However, when the fluorescent lamp is replaced by a LED light source, as the LED light source has non-linear devices such as diodes, switch devices, etc., current distortion may occurs, and the protection circuit working in a current changing rate detection manner, may be falsely triggered. Moreover, the LED light source replacing the fluorescent lamp has a lower power, which may greatly reduce protection effect of the protection circuit working in a power detection manner. Hence, in the conventional technology, a thermal fuse is added at a pin of the lamp cap. When an arcing occurs and a high temperature is generated, the thermal fuse is melted, such that the LED light source is disconnected from the current loop. However, after the thermal fuse is melted, the LED light source is damaged and is unable to revert.

SUMMARY

In order to solve the problem that the LED light source is unable to revert after the arcing protection in the conventional technology, a LED light source and a circuit for driving the same is provided.

In one embodiment, a circuit for driving a LED light source is provided. The circuit may include: a bridge rectifier, a switch unit, a current detection unit and a logic control unit, wherein the circuit is connected between an electronic ballast and a set of light emitting diodes of the LED light source;

wherein an Alternating Current (AC) input terminal of the bridge rectifier is connected with the electronic ballast; a positive output terminal of the bridge rectifier is connected with an anode of the set of light emitting diodes; and the bridge rectifier is adapted for converting AC power to Direct Current (DC) power;

wherein the switch unit and the current detection unit are connected in series between a cathode of the set of light emitting diodes and a negative output terminal of the bridge rectifier; the switch unit is adapted for switching on or switching off a path according to a control signal, where the set of light emitting diodes is adapted for receiving the DC power from the path when the path is switched on; and the current detection unit is adapted for detecting a current signal flowing through the set of light emitting diodes; and wherein the logic control unit is connected between the positive output terminal and the negative output terminal of the bridge rectifier; an input terminal of the logic control unit is connected with the output terminal of the current detection unit; an output terminal of the logic control unit is connected with a control terminal of the switch unit; the logic control unit is adapted for generating a corresponding control signal according to the current signal, so as to control the switch unit to switch off the path; and the logic control unit is adapted for determining according to a voltage of the DC power, where when a delay restart condition is met, the logic control unit is adapted for generating a corresponding control signal, so as to control the switch unit to switch on the path.

In some embodiments, the circuit may include: a capacitor connected between the anode and the cathode of the set of light emitting diodes, wherein the capacitor is adapted for performing a filtering operation on the DC power; and a current regulation unit connected in series between the positive output terminal of the rectifier bridge and the set of light emitting diodes, wherein the current regulation unit is adapted for regulating the current flowing into the set of light emitting diodes in order to keep the current constant.

In some embodiments, the current regulation unit is a linear regulator or a switching-mode converter.

In some embodiments, the switch unit is a Metal-Oxide-Semiconductor Field-Effect Transistor (MOSFET), an Insulated Gate Bipolar Transistor (IGBT), a bipolar transistor or a relay.

In some embodiments, the current detection unit is a resistor, where a connection node of the resistor and the switch unit servers as the output terminal of the current detection unit.

In some embodiments, the logic control unit includes: a low-pass filter, a current reference module, a compactor, a gate driving module and a delay restart module, wherein an input terminal of the low-pass filter serves as the input terminal of the logic control unit; an output terminal of the low-pass filter is connected with a positive input terminal of the compactor; and the low-pass filter is adapted to filter out the low frequency components of the current signal flowing through the set of light emitting diodes, so as to obtain a filtered current signal;

wherein the current reference module is connected between a negative input terminal of the comparator and the negative output terminal of the bridge rectifier; the current reference module is adapted for outputting a current reference signal; and the comparator compares the filtered current signal with the current reference signal and outputs a comparison result;

wherein input terminals of the gate driving module are respectively connected with the output terminal of the comparator and the output terminal of the delay restart module; an output terminal of the gate driving module serves as the output terminal of the logic control unit; and the gate driving module is adapted for generating and outputting the control signal according to the comparison result and a restart signal; and wherein an input terminal of the delay restart module is connected with the positive output terminal of the bridge rectifier or the cathode of the set of light emitting diodes; and the delay restart module is adapted for determining according to a voltage value of the DC power, where, when the delay restart condition is met, the delay restart module is adapted for generating and outputting the restart signal.

In some embodiments, the comparator is a hysteresis comparator.

In some embodiments, the logic control unit includes: a peak detector, a current reference module, a compactor, a gate driving module and a delay restart module, wherein an input terminal of the peak detector filter serves as the input terminal of the logic control unit; an output terminal of the peak detector is connected with a negative input terminal of the compactor; and the peak detector is adapted for detecting a peak value of the current signal flowing through the set of light emitting diodes;

wherein the current reference module is connected between a positive input terminal of the comparator and the negative output terminal of the bridge rectifier; the current reference module is adapted for outputting a current reference signal; and the comparator compares the peak value of the current signal with the current reference signal and outputs a comparison result;

wherein input terminals of the gate driving module are respectively connected with the output terminal of the comparator and the output terminal of the delay restart module; an output terminal of the gate driving module serves as the output terminal of the logic control unit; and the gate driving module is adapted for generating and outputting the control signal according to the comparison result and a restart signal; and wherein an input terminal of the delay restart module is connected with the positive output terminal of the bridge rectifier; and the delay restart module is adapted for determining according to a voltage value of the DC power, where, when the delay restart condition is met, the delay restart module is adapted for generating and outputting the restart signal.

In some embodiments, the comparator is a hysteresis comparator.

In some embodiments, the logic control unit includes: a pulse width detection module, a gate driving module and a delay restart module, wherein an input terminal of the pulse width detection module serves as the input terminal of the logic control unit; and the pulse width detection module is adapted for detecting a pulse width of the current signal;

wherein input terminals of the gate driving module are respectively connected with an output terminal of the pulse width detection module and an output terminal of the delay restart module; an output terminal of the gate driving module serves as the output terminal of the logic control unit; and the gate driving module is adapted for generating and outputting the control signal according to the pulse width of the current signal or a restart signal; and wherein an input terminal of the delay restart module is connected with the positive output terminal of the bridge rectifier or the cathode of the set of light emitting diodes; and the delay restart module is adapted for determining according to a voltage value of the DC power, where, when the delay restart condition is met, the delay restart module is adapted for generating and outputting the restart signal.

In one embodiment, a LED light source is also provided. The LED light source may include: a set of light emitting diodes, a driving device connected between an electronic ballast and the set of light emitting diodes, wherein the driving device includes the circuit for driving a LED light source described above.

A circuit for driving LED light source is provided in this disclosure. When an arcing phenomenon occurs, the current detection unit detects a current signal flowing through the set of light emitting diodes; the logic control unit is adapted for generating a corresponding control signal according to the current signal, so as to control the switch unit to switch off a path from which the set of light emitting diodes receive DC power. Thus, the arcing is eliminated or suppressed, and arcing protection is achieved. After the arcing protection is achieved, the logic control circuit is adapted for determining according to a voltage value of the DC power. When a delay restart condition is met, the logic control unit is adapted for generating a corresponding control signal, so as to control the switch unit to switch on the path. Thus the LED light source is restarted to use.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In order to clarify the objects, characteristics and advantages of the disclosure, the embodiments of the present disclosure will be described in detail in conjunction with the accompanying drawings. Obviously, the described embodiments are only a part of the present invention, but not all embodiments. It should be understood by those skilled in the art that various changes may be made without departing from the spirit or scope of the disclosure.

In order to solve the problem that the LED power source cannot revert to a working state after the arcing protection, a circuit for driving a LED light source is provided in embodiments of the present disclosure.

Figure 1:
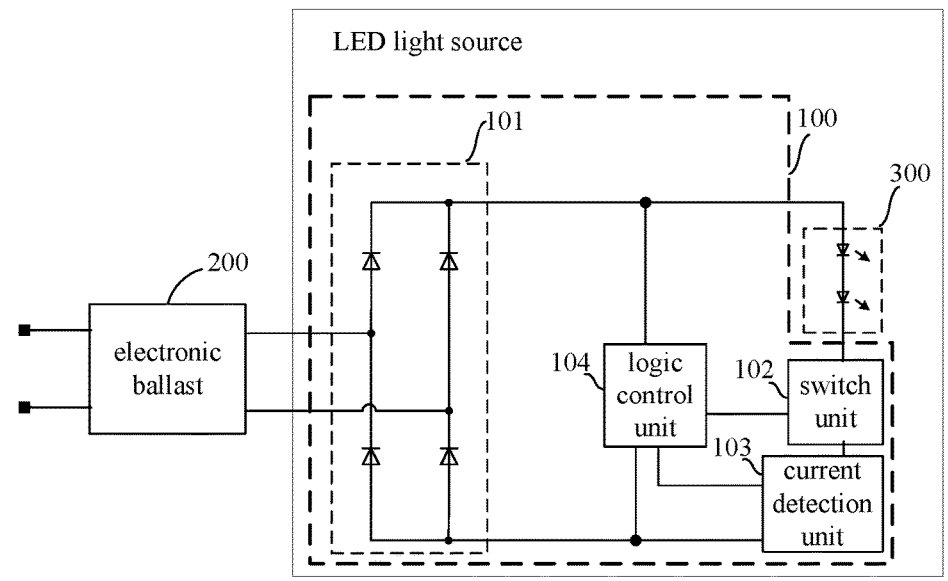
FIG. 1 schematically illustrates a structure diagram of a LED light source according to one embodiment of the present disclosure.

Specifically, as shown in FIG. 1, a circuit 100 for driving a LED light source is connected between an electronic ballast 200 and a set of light emitting diodes 300 of the LED light source. The circuit 100 for driving LED light source may include: a bridge rectifier 101, a switch unit 102, a current detection unit 103 and a logic control unit 104, wherein an AC input terminal of the bridge rectifier 101 is connected with the electronic ballast 200, and a positive output terminal of the electronic ballast 101 is connected with an anode of the set of light emitting diodes 300;

wherein the switch unit 102 and the current detection unit 103 are connected in series between a cathode of the set of light emitting diodes 300 and a negative output terminal of the bridge rectifier 101; and wherein the logic control unit 104 is connected between the positive output terminal and the negative output terminal of the bridge rectifier 101; an input terminal of the logic control unit 104 is connected with an output terminal of the current detection unit 103; and an output terminal of the logic control unit 104 is connected with a control terminal of the switch unit 102.

A working principle of the circuit is described as follows. The bridge rectifier 101 is adapted for converting AC power output by the electronic ballast 200 to DC power; the switch unit 102 is adapted for switching on or switching off a path according to a control signal, where the set of light emitting diodes 300 receives the DC power through the path; the current detection unit 103 is adapted for detecting a current signal flowing through the set of light emitting diodes 300; the logic control unit 104 is adapted for generating a corresponding control signal based on the current signal, so as to control the switch unit 102 to switch off the path; and the logic control unit 104 is further adapted for determining according to a voltage of the DC power, where when a delay restart condition is met, the logic control unit 104 is adapted for generating a corresponding control signal, so as to control the switch unit 102 to switch on the path.

In one embodiment of the present disclosure, when the arcing occurs, the current detection unit 103 of the circuit for driving LED light source detects the current signal flowing through the set of light emitting diodes 300. The logic control unit 104 generates a corresponding control signal according to the current signal, so as to control the switch unit 102 to cut off a path from which the set of light emitting diodes 300 receives the DC power. Hence, the arcing phenomenon is eliminated or suppressed, and arcing protection is achieved. After the arcing protection is achieved, the logic control unit 104 can determine according to a voltage of the DC power, if a delay restart condition is met, the logic control unit 104 is adapted for generating a corresponding control signal, so as to control the switch unit 102 to switch on the path, such that the LED light source restarts to work. Thus, the problem in the conventional technology, that the LED light source is unable to revert after the arcing protection, can be solved.

Further, only when the delay restart condition is met, the logic control unit 104 generates the control signal to control the switch unit 102 to switch on the path. Even if the arcing occurs after the path is closed, the path can be disconnected again; and when the delay restart condition is met, the path can be closed again. The delay restart condition provides an interval time for the arcing phenomenon, such that the arcing phenomenon cannot occurs continuously, and the appearances of high temperature and corresponding safety risk are avoided.

Figure 2:
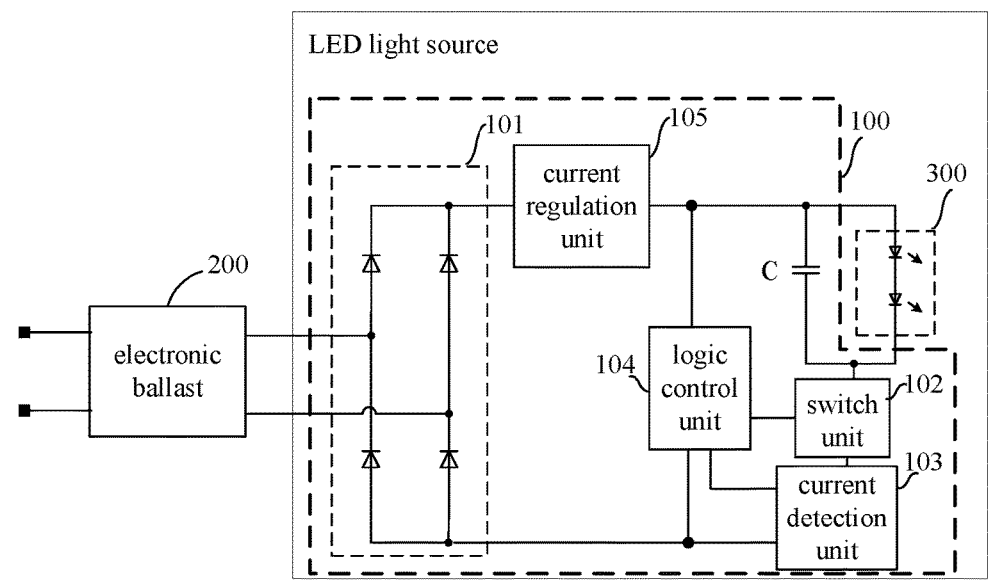
FIG. 2 schematically illustrates a structure diagram of a LED light source according to another embodiment of the present disclosure.

In some embodiments, as shown in FIG. 2, the circuit 100 for driving LED light source may further include a capacitor C connected between the anode and the cathode of the set of light emitting diodes 300.

The capacitor C connected in parallel can perform a filtering operation on the DC power to obtain a filtered DC power, and then the filtered DC power is transmitted to the set of light emitting diodes 300.

In some embodiments, the circuit may further include a current regulation unit 105 connected in series between the positive output terminal of the rectifier bridge 101 and the set of light emitting diodes 300, wherein the current regulation unit 105 is adapted to regulate the current into the set of light emitting diodes in order to keep the current constant. The current regulation unit 105 could be a linear regulator or a switching-mode converter.

In some embodiments, the switch unit 102 may be a Metal-Oxide-Semiconductor Field-Effect Transistor (MOSFET), an Insulated Gate Bipolar Transistor (IGBT), a bipolar transistor or a relay.

In specific embodiments, the implementation forms of the switch unit may be determined based on specific application environments, and are not limited herein.

Figure 3:
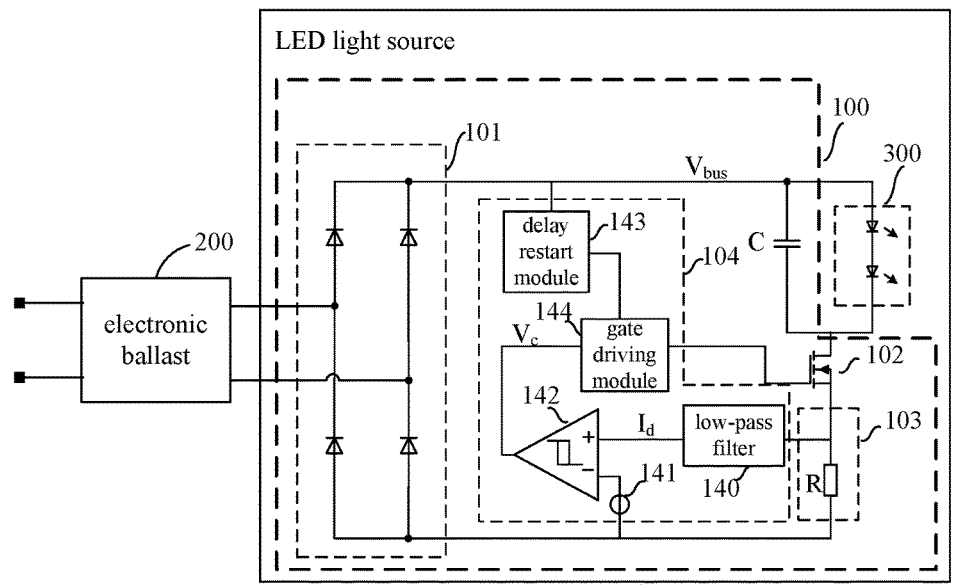
FIG. 3 schematically illustrates a structure diagram of a LED light source according to another embodiment of the present disclosure.

In some embodiments, as shown in FIG. 3, the current detection unit 103 may be a resistor R, where a connection node of the resistor R and the switch unit 102 servers as the output terminal of the current detection unit 103.

In some embodiments, as shown in FIG. 3, the logic control unit 104 includes:

a low-pass filter 140, where an input terminal of the low-pass filter 140 serves as the input terminal of the logic control unit 104;

a current reference module 141, where a first terminal of the current reference module 141 is connected with the negative output terminal of the bridge rectifier 101;

a compactor 142, where a negative input terminal of the comparator 142 is connected with a second terminal of the current reference module 141, and a positive input terminal of the comparator 142 is connected with an output terminal of the low-pass filter 140;

a delay restart module 143, where an input terminal of the delay restart module 143 is connected with the positive output terminal of the bridge rectifier 101; and a gate driving module 144, where a first input terminal and a second input terminal of the gate driving module 144 are connected with the output terminal of the comparator 142 and the output terminal of the delay restart module 143 respectively, and an output terminal of the gate driving module 144 serves as the output terminal of the logic control unit 104.

It should be noted that, in another embodiment, the input terminal of the delay restart module 143 may be connected with the cathode of the set of light emitting diodes 300, so as to obtain an input signal from the cathode of the set of light emitting diodes 300.

A working principle of the logic control unit 104 is described as follows. The resistor R is adapted for converting a current signal to a voltage signal. The low-pass filter 140 performs a filter operation on the current signal flowing through the set of light emitting diodes 300. That is, high frequency components of the voltage signal are removed, and only a smooth low frequency signal is transmitted to the logic control unit 104. Namely, the low-pass filter 140 is adapted to filter out the low frequency components of the current signal flowing through the set of light emitting diodes.

The current reference module 141 is adapted for outputting a current reference signal. The comparator 142 compares the detection signal with the current reference signal and outputs a comparison result. Then the delay restart module 143 determines whether a delay restart condition is met based on a voltage value of the DC power, and if the delay restart condition is met, the delay restart module generates and outputs a restart signal. At last, the gate driving module 144 generates a control signal based on the comparison result or the restart signal, and outputs the control signal to the switch unit 102 to switch on/off the current to the set of light emitting diodes 300.

Figure 4:
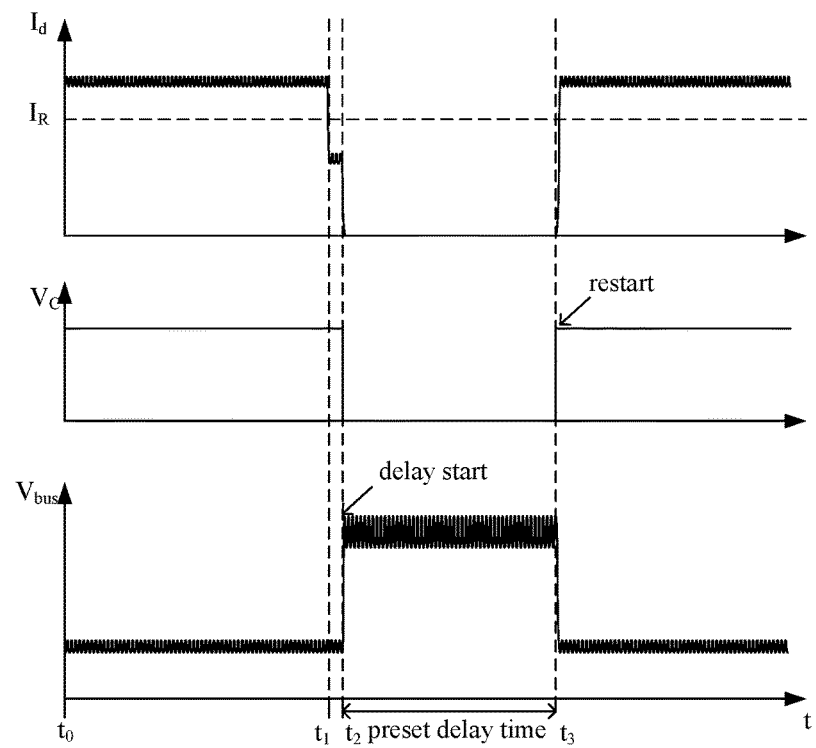
FIG. 4 schematically illustrates a waveform diagram of signals in the LED light source according to one embodiment of the present disclosure.

FIG. 4 illustrates a waveform diagram of the LED light source shown in FIG. 3 when an arcing phenomenon occurs, where the horizontal axis represents time, $I_d$ represents the output signal of the low-pass filter 140, $V_c$ represents the output signal of the comparator 142, and $V_{bus}$ represents the output signal of the bridge rectifier 101.

When $t_0 \leq t < t_1$, the LED light source works properly, and the output signal $I_d$ of the low-pass filter is proportional to an average current of the set of light emitting diodes 300. At this time, $I_d > I_R$, where $I_R$ represents the threshold of the comparator 142 ($I_R$ is determined by the current reference module 141). The output signal $V_c$ of the comparator 142 has a high level, the gate driving module 144 outputs a high level signal, the switch unit 102 is switched on, and the output voltage $V_{bus}$ of the bridge rectifier 101 is equal to a voltage drop on the set of light emitting diodes 300.

When $t_1 \leq t < t_2$, the arcing occurs. The arcing always occurs at a position where the electronic ballast 200 and the LED light source are poorly contacted. Thus, the position is equivalent to a high resistive load connected between them in series and results in a decrease of average current flowing into the light source, such that the output current $I_d$ of the low-pass filter 140 decreases to be lower than $I_R$, the output signal $V_c$ of the comparator 142 is turned into a low level, the gate driving module 144 outputs a low level signal and the switch unit 102 is switched off. The time between $t_1$ and $t_2$ is very short, and can be understood as a response time of the comparator 142.

When $t_2 \leq t < t_3$, at the time of $t_2$, the switch unit 102 is switched off, the current loop is disconnected, the arcing is stopped, and an output voltage $V_{bus}$ of the bridge rectifier 101 is turned to be an open-circuit voltage of the electronic ballast 200, which has a high voltage level. As the output voltage $V_{bus}$ of the bridge rectifier 101 increases, the delay restart module 143 is triggered. A delay time of the delay restart module 143 is preset. For example, the delay time ranges from tens of milliseconds to a few seconds. However, the present disclosure is not limited thereto.

When $t_3 \leq t$, at the time of $t_3$, the preset delay time ends, the delay restart module 143 outputs a high level signal to the gate driving module 144 and switches on the switch unit 102 again, a current flows through the set of light emitting diodes 300, the output voltage $V_{bus}$ of the bridge rectifier 101 is equal to a voltage on the set of light emitting diodes 300, correspondingly, the output current $I_d$ of the low-pass filter 140 raises to a level higher than $I_R$. The output signal $V_c$ of the comparator 142 is turned into a high level, and the gate driving module 144 maintains the switch unit 102 being switched on.

If the current of the set of light emitting diodes 300 is reverted and the arcing occurs again, the average current of the set of light emitting diodes 300 decreases. The steps of $t_1 \sim t_3$ repeat. Because the current loop is cut off, the arcing will not continue to occur. Thus the appearances of high temperature and corresponding safety risk are avoided.

In a specific embodiment, the delay restart module 143 can be triggered by other mechanisms, which are not limited herein.

In some embodiments, the comparator 142 may be a hysteresis comparator. A fault output of the comparator 142, caused by interference signals, may be avoided by a properly configured hysteresis interval.

Figure 5:
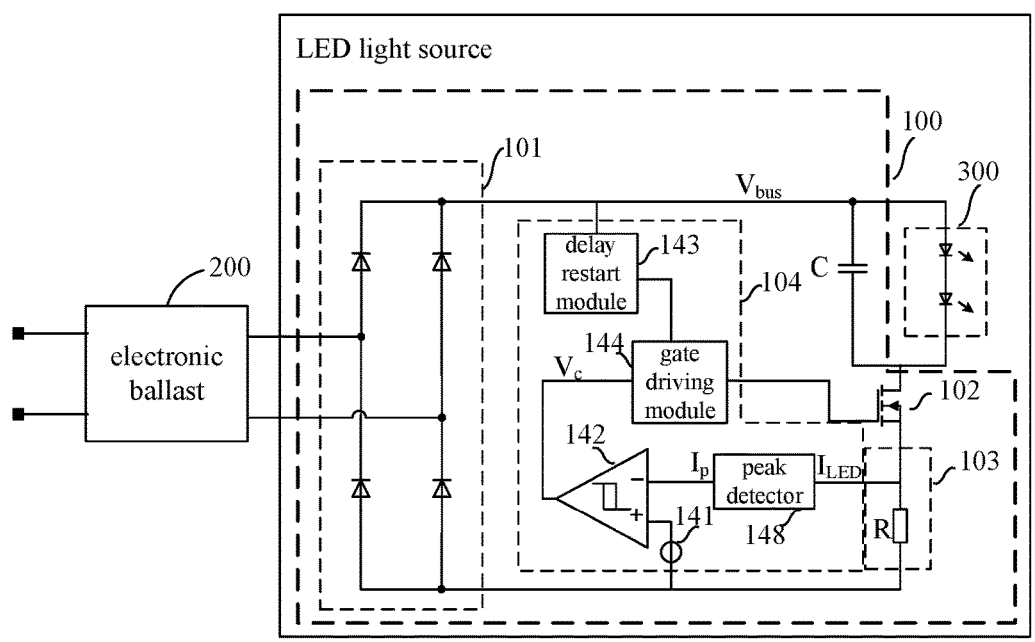
FIG. 5 schematically illustrates a structure diagram of a LED light source according to another embodiment of the present disclosure.

As shown in FIG. 5, a circuit for driving LED light source is also provided in another embodiment of the present disclosure. Difference between FIG. 5 and FIG. 3 is that, the logic control unit 104 in FIG. 5 has a peak detector 148 to replace the low-pass filter 140 in FIG. 3.

The peak detector 148 has an input terminal connected to the output terminal of the current detection unit 103, and an output terminal connected to the negative input terminal of the comparator 142. The positive terminal of the comparator 142 is connected to the output terminal of the current reference module 141.

A working principle of the logic control unit 104 shown in FIG. 5 is described as follows:

the peak detector 148 is adapted for detecting a peak value of the current through the set of the light emitted diodes 300. The current reference module 141 is adapted for outputting a current reference signal. The comparator 142 compares the detection signal with the current reference signal and outputs a comparison result. Then the delay restart module 143 determines whether a delay restart condition is met based on a voltage value of the DC power, and if the delay restart condition is met, the delay restart module generates and outputs a restart signal. At last, the gate driving module 144 generates a control signal based on the comparison result or the restart signal, and outputs the control signal to the switch unit 102 to switch on/off the current to set of light emitting diodes 300.

Figure 6:
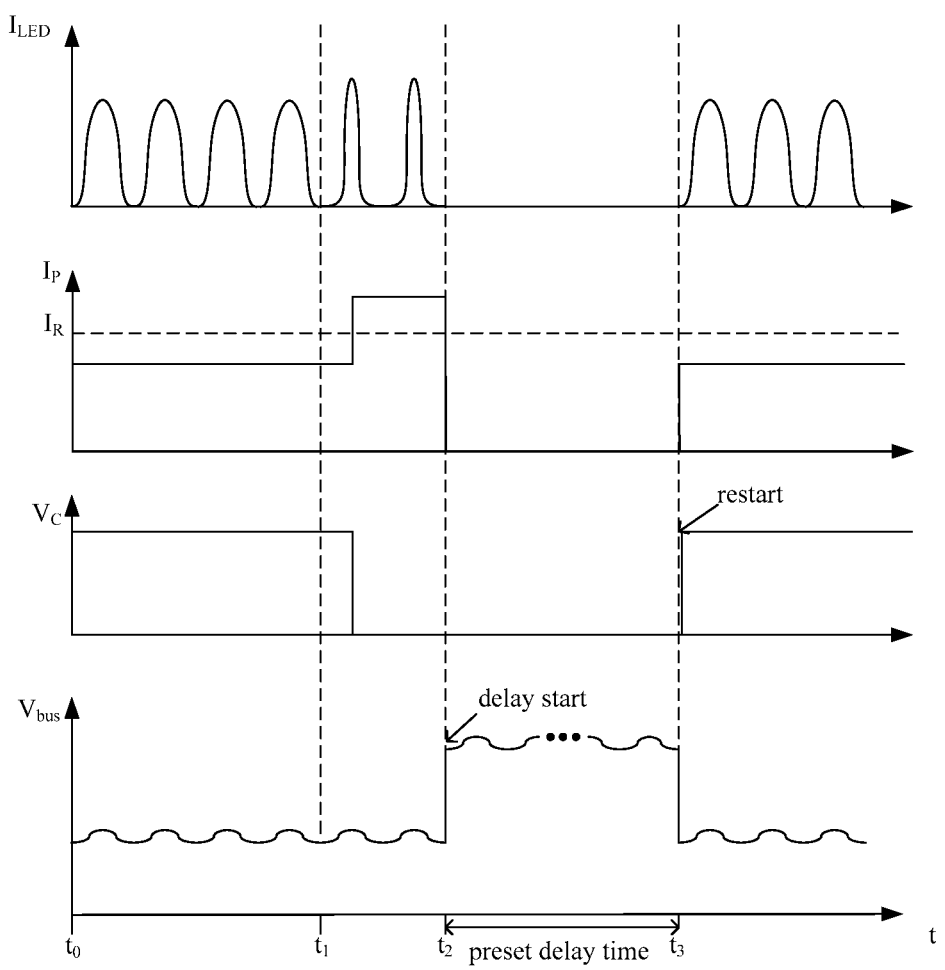
FIG. 6 schematically illustrates a waveform diagram of signals in the LED light source according to another embodiment of the present disclosure.

FIG. 6 illustrates a waveform diagram of the LED light source shown in FIG. 5 when an arcing phenomenon occurs, where the horizontal axis represents time, $I_{LED}$ represents the current signal through the set of the light emitted diodes 300, $I_p$ represents the output signal of the peak detector 148, $V_c$ represents the output signal of the comparator 142, and $V_{bus}$ represents the output signal of the bridge rectifier 101.

When $t_0 \leq t < t_1$, the LED light source works properly, $I_{LED}$ is a normal waveform, and the output signal $I_p$ of the peak detector is lower than $I_R$, where $I_R$ represents the threshold of the comparator 142 ($I_R$ is determined by the current reference module 141). The output signal $V_c$ of the comparator 142 has a high level, the gate driving module 144 outputs a high level signal, the switch unit 102 is switched on, and the output voltage $V_{bus}$ of the bridge rectifier 101 is equal to a voltage drop on the set of light emitting diodes 300.

When $t_1 \leq t < t_2$, the arcing occurs. The arcing always occurs at a position where the electronic ballast 200 and the LED light source are poorly contacted. Thus, the position is equivalent to a high resistive load connected between them in series and results in an increase of the peak value of the current flowing into the light source, such that the output signal $I_p$ of the peak detector 148 increases to be higher than $I_R$, the output signal $V_c$ of the comparator 142 is turned into a low level, the gate driving module 144 outputs a low level signal and the switch unit 102 is switched off. The time between $t_1$ and $t_2$ is very short, and can be understood as a response time of the comparator 142.

When $t_2 \leq t < t_3$, at the time of $t_2$, the switch unit 102 is switched off, the current loop is disconnected, the arcing is stopped, and an output voltage $V_{bus}$ of the bridge rectifier 101 is turned to be an open-circuit voltage of the electronic ballast 200, which has a high voltage level. As the output voltage $V_{bus}$ of the bridge rectifier 101 increases, the delay restart module 143 is triggered. A delay time of the delay restart module 143 is preset. For example, the delay time ranges from tens of milliseconds to a few seconds. However, the present disclosure is not limited thereto.

When $t_3 \leq t$, at the time of $t_3$, the preset delay time ends, the delay restart module 143 outputs a high level signal to the gate driving module 144 and switches on the switch unit 102 again, a current flows through the set of light emitting diodes 300, the output voltage $V_{bus}$ of the bridge rectifier 101 is equal to a voltage on the set of light emitting diodes 300, correspondingly, the output signal $I_p$ of the peak detector 148 drops to a level lower than $I_R$, the output signal $V_c$ of the comparator 142 is turned into a high level, and the gate driving module 144 maintains the switch unit 102 being switched on.

If the current of the set of light emitting diodes 300 is reverted and the arcing occurs again, the average current of the set of light emitting diodes 300 decreases. The steps of $t_1 \sim t_3$ repeat. Because the current loop is cut off, the arcing will not continue to occur. Thus the appearances of high temperature and corresponding safety risk are avoided.

Figure 7:
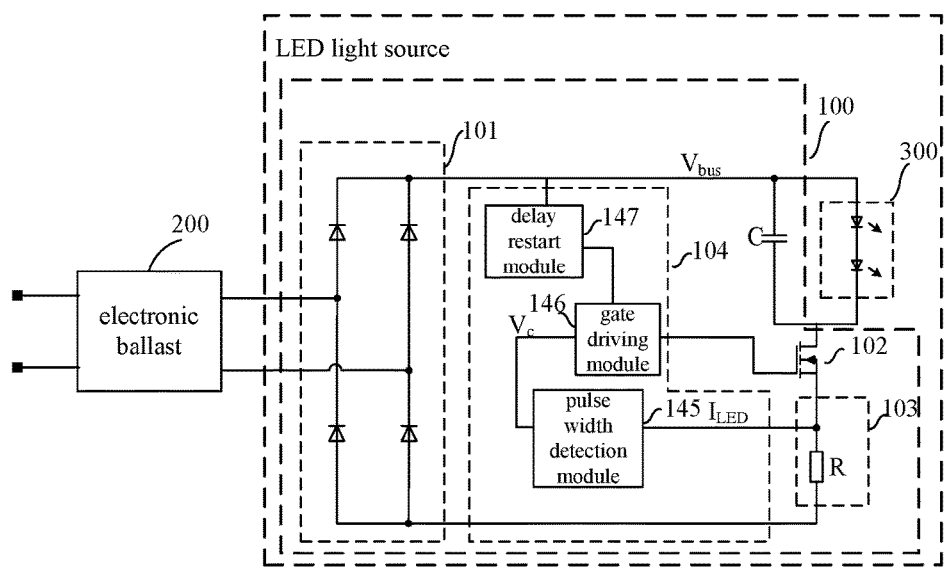
FIG. 7 schematically illustrates a structure diagram of a LED light source according to another embodiment of the present disclosure.

As shown in FIG. 7, a circuit for driving LED light source is also provided in another embodiment of the present disclosure. Difference between FIG. 7 and FIG. 3 is that, the logic control unit 104 in FIG. 7 includes: a pulse width detection module 145, a gate driving module 146 and a delay restart module 147, wherein an input terminal of the pulse width detection module 145 serves as an input terminal of the logic control unit 104;

wherein input terminals of the gate driving module 146 are connected with an output terminal of the pulse width detection module 145 and an output terminal of the delay restart module 147 respectively, and an output terminal of the gate driving module 146 serves as an output terminal of the logic control unit 104; and wherein an input terminal of the delay restart module 147 is connected with the positive output terminal of the bridge rectifier 101.

A working principle of the logic control unit 104 shown in FIG. 7 is described as follows:

the pulse width detection module 145 is adapted for detecting a pulse width of the current signal;

the gate driving module 146 is adapted for generating and outputting a control signal according to the pulse width of the current signal or a restart signal;

the delay restart module 147 is adapted for determining according to a voltage value of the DC power, where, if a delay restart condition is met, the delay restart module 147 generates and outputs a restart signal.

Figure 8:
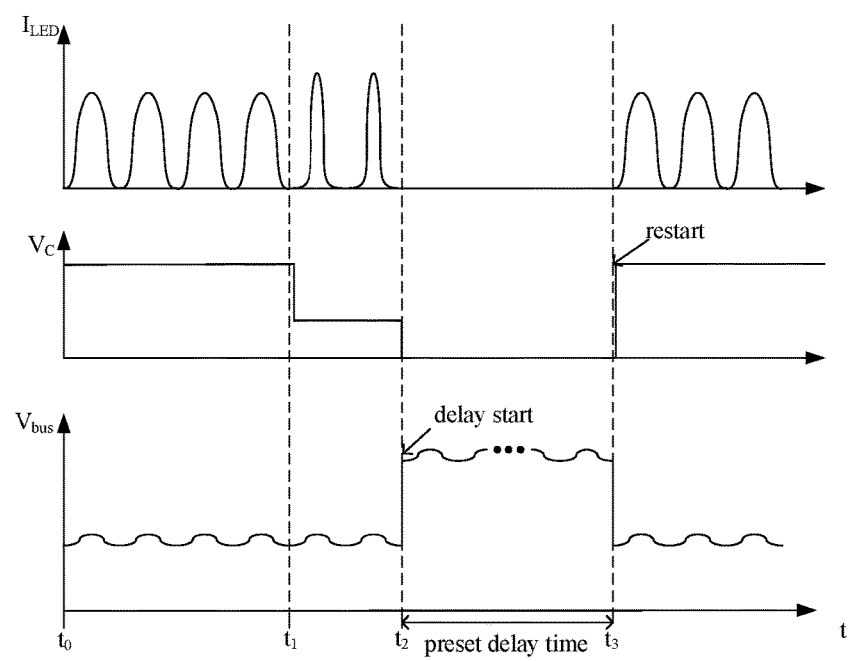
FIG. 8 schematically illustrates a waveform diagram of a LED light source according to another embodiment of the present disclosure.

FIG. 8 illustrates a waveform diagram of the LED light source shown in FIG. 7 when an arcing phenomenon occurs, where the horizontal axis represents time, $I_{LED}$ represents the current signal through the set of the light emitted diodes 300, $V_c$ represents the output voltage of the pulse width detection module 145, and $V_{bus}$ represents the output terminal of the bridge rectifier 101.

When $t_0 \leq t < t_1$, the LED light source works properly, and the pulse width of the current signal $I_d$ is large. The output voltage $V_c$ of the pulse width detection module 145 is proportionally a high level signal. The gate driving module 146 outputs a high level signal, the switch unit 102 is switched on, and $V_{bus}$ is equal to an voltage drop on the set of light emitting diodes 300.

When $t_1 \leq t < t_2$, the arcing occurs. The arcing always occurs at a position where the electronic ballast 200 and the LED light source are poorly contacted. The position is equivalent to a high resistive load connected between them in series and results in a decrease of a pulse width of the current pulse flowing into the light source, such that an output voltage $V_c$ of the pulse width detection module 145 decreases to be a low level, and the gate driving module 146 outputs a low level signal. The time between $t_1$ and $t_2$ is very short, and can be understood as a response time of the entire circuit.

When $t_2 \leq t < t_3$, at the time of t2, the switch unit 102 is switched off, the current loop is disconnected, and the arcing is stopped. The output voltage $V_{bus}$ of the bridge rectifier 101 is turned into an output open-circuit voltage of the electronic ballast 200, which has a high voltage level. As the output voltage $V_{bus}$ of the bridge rectifier 101 increases, the delay restart module 147 is triggered. The time between $t_2$ and $t_3$ is a preset delay time in the delay restart module 147. For example, the time ranges from tens of milliseconds to a few seconds. However, the present disclosure is not limited thereto.

When $t_3 \le t$, at the time of $t_3$, the preset delay time ends, the delay restart module 147 outputs a high level signal to the gate driving module 146 and switches on the switch unit 102 again, a current flows through the set of light emitting diodes 300, the output voltage $V_{bus}$ of the bridge rectifier 101 is equal to a voltage on the set of light emitting diodes 300, correspondingly, the current signal LED reverts to a pulse having a large width, the output of the pulse width detection module 145 reverts to a high level signal, and the gate driving module 144 maintains the switch unit 102 being switched on.

If the current of the set of light emitting diodes 300 is reverted and the arcing occurs again, the pulse width of the current signal $I_{ED}$ decreases again. Then the steps of $t_1 \sim t_3$ repeat. Because the current loop is cut off, the arcing will not continue to occur. Thus the appearances of high temperature and corresponding safety risk are avoided.

In a specific embodiment, the delay restart module 147 can be triggered by other mechanisms, which are not limited herein.

An LED light source is also provided in embodiments of the present disclosure. The LED light source may include: a set of light emitting diodes, and a driving device connected between an electronic ballast and the set of light emitting diodes, where the driving device includes the driving circuit described in above embodiments.

The application forms and working principles of the driving circuit are similar to above embodiments, and are not described in detail herein.

It should be noted that, the driving device may further include other circuits, for example, a filter connected between the electronic ballast and the bridge rectifier, which is adapted for filtering high frequency noises, or a modulator circuits connected between the bridge rectifier and the set of light emitting diodes, which is adapted for modulating the current flowing through the set of light emitting diodes. Various circuits may be added in the driving device of the present disclosure, and will not be described in detail herein. They are within the scope of the present application.

Figure 9:
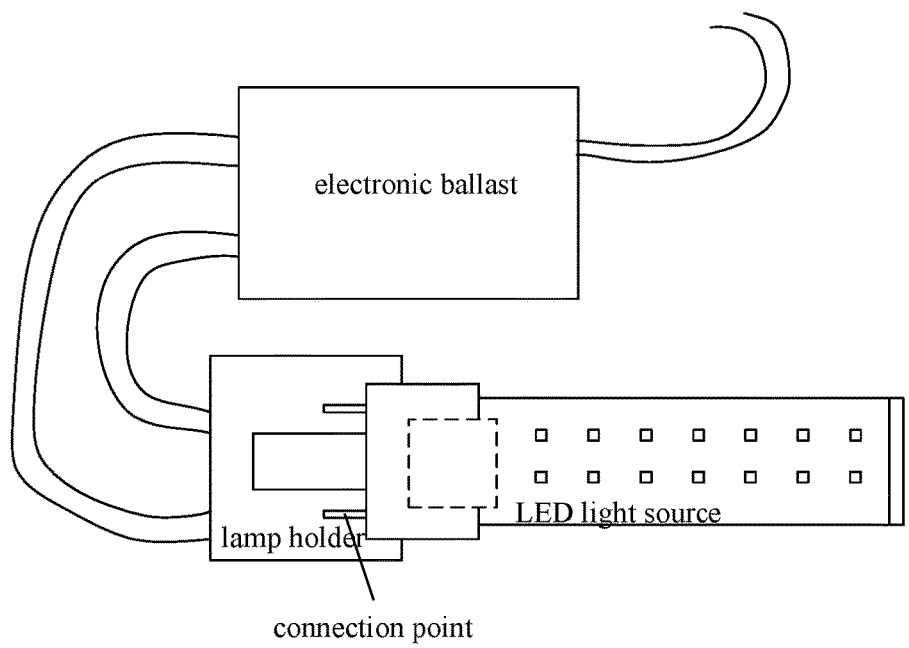
FIG. 9 schematically illustrates a structure diagram of a LED light source according to another embodiment of the present disclosure.
Figure 10:
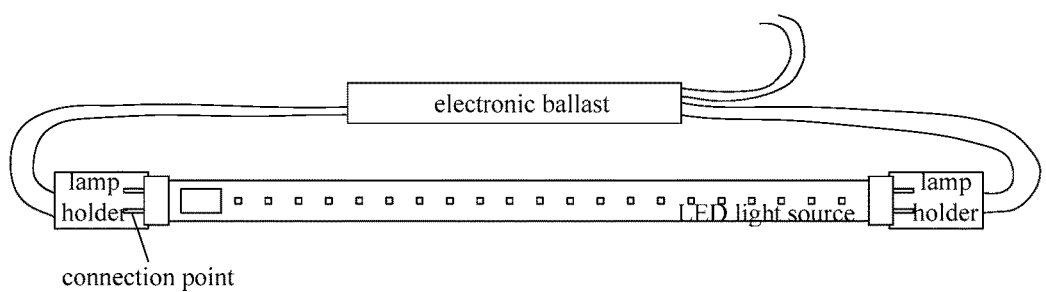
FIG. 10 schematically illustrates a structure diagram of a LED light source according to another embodiment of the present disclosure.

In a specific embodiment, the LED light source may be a single-ended LED light source as shown in FIG. 9, or a double-ended LED light source as shown in FIG. 10. One or more connection points may be disposed on the LED light source, and the LED light source can be connected with the output terminal of the electronic ballast in a lamp holder.

The embodiments of the present disclosure are described in a progressive manner. The different part of each embodiment is described in detail, and the same or similar part of the embodiments may be referred to each other. For the device disclosed in embodiments of the present disclosure, because it is corresponding to the method described above, the description is relatively simple. Thus, more detail about the device can be found in corresponding method.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A circuit for driving Light-Emitting Diode (LED) light source, comprising: a bridge rectifier, a switch unit, a current detection unit and a logic control unit, wherein the circuit is connected between an electronic ballast and a set of light emitting diodes of the LED light source;

wherein an Alternating Current (AC) input terminal of the bridge rectifier is connected with the electronic ballast; a positive output terminal of the bridge rectifier is connected with an anode of the set of light emitting diodes; and the bridge rectifier is adapted for converting AC power to Direct Current (DC) power;

wherein the switch unit and the current detection unit are connected in series between a cathode of the set of light emitting diodes and a negative output terminal of the bridge rectifier; the switch unit is adapted for switching on or switching off a path according to a control signal, where the set of light emitting diodes is adapted for receiving the DC power from the path when the path is switched on; and the current detection unit is adapted for detecting a current signal flowing through the set of light emitting diodes; and wherein the logic control unit is connected between the positive output terminal and the negative output terminal of the bridge rectifier; an input terminal of the logic control unit is connected with the output terminal of the current detection unit; an output terminal of the logic control unit is connected with a control terminal of the switch unit; the logic control unit is adapted for generating a corresponding control signal according to the current signal, so as to control the switch unit to switch off the path; and the logic control unit is adapted for determining according to a voltage of the DC power, where when a delay restart condition is met, the logic control unit is adapted for generating a corresponding control signal, so as to control the switch unit to switch on the path.

2. The circuit for driving LED light source according to claim 1, further comprising:

a capacitor connected between the anode and the cathode of the set of light emitting diodes, wherein the capacitor is adapted for performing a filtering operation on the DC power; and a current regulation unit connected in series between the positive output terminal of the rectifier bridge and the set of light emitting diodes, wherein the current regulation unit is adapted for regulating the current flowing into the set of light emitting diodes in order to keep the current constant.

3. The circuit for driving LED light source according to claim 2, wherein the current regulation unit is a linear regulator or a switching-mode converter.

4. The circuit for driving LED light source according to claim 1, wherein the switch unit is a Metal-Oxide-Semiconductor Field-Effect Transistor (MOSFET), an Insulated Gate Bipolar Transistor (IGBT), a bipolar transistor or a relay.

5. The circuit for driving LED light source according to claim 1, wherein the current detection unit is a resistor, where a connection node of the resistor and the switch unit servers as the output terminal of the current detection unit.

6. The circuit for driving LED light source according to claim 1, wherein the logic control unit comprises: a low-pass filter, a current reference module, a compactor, a gate driving module and a delay restart module, wherein an input terminal of the low-pass filter serves as the input terminal of the logic control unit; an output terminal of the low-pass filter is connected with a positive input terminal of the compactor; and the low-pass filter is adapted for performing a filter operation on the current signal flowing through the set of light emitting diodes, so as to obtain a filtered current signal;

wherein the current reference module is connected between a negative input terminal of the comparator and the negative output terminal of the bridge rectifier; the current reference module is adapted for outputting a current reference signal; and the comparator compares the filtered current signal with the current reference signal and outputs a comparison result;

wherein input terminals of the gate driving module are respectively connected with the output terminal of the comparator and the output terminal of the delay restart module; an output terminal of the gate driving module serves as the output terminal of the logic control unit; and the gate driving module is adapted for generating and outputting the control signal according to the comparison result and a restart signal; and wherein an input terminal of the delay restart module is connected with the positive output terminal of the bridge rectifier or the cathode of the set of light emitting diodes; and the delay restart module is adapted for determining according to a voltage value of the DC power, where, when the delay restart condition is met, the delay restart module is adapted for generating and outputting the restart signal.

7. The circuit for driving LED light source according to claim 6, wherein the comparator is a hysteresis comparator.

8. The circuit for driving LED light source according to claim 1, wherein the logic control unit comprises: a peak detector, a current reference module, a compactor, a gate driving module and a delay restart module, wherein an input terminal of the peak detector filter serves as the input terminal of the logic control unit; an output terminal of the peak detector is connected with a negative input terminal of the compactor; and the peak detector is adapted for detecting a peak value of the current signal flowing through the set of light emitting diodes;

wherein the current reference module is connected between a positive input terminal of the comparator and the negative output terminal of the bridge rectifier; the current reference module is adapted for outputting a current reference signal; and the comparator compares the peak value of the current signal with the current reference signal and outputs a comparison result;

wherein input terminals of the gate driving module are respectively connected with the output terminal of the comparator and the output terminal of the delay restart module; an output terminal of the gate driving module serves as the output terminal of the logic control unit; and the gate driving module is adapted for generating and outputting the control signal according to the comparison result and a restart signal; and wherein an input terminal of the delay restart module is connected with the positive output terminal of the bridge rectifier or the cathode of the set of light emitting diodes; and the delay restart module is adapted for determining according to a voltage value of the DC power, where, when the delay restart condition is met, the delay restart module is adapted for generating and outputting the restart signal.

9. The circuit for driving LED light source according to claim 8, wherein the comparator is a hysteresis comparator.

10. The circuit for driving LED light source according to claim 1, wherein the logic control unit comprises: a pulse width detection module, a gate driving module and a delay restart module, wherein an input terminal of the pulse width detection module serves as the input terminal of the logic control unit; and the pulse width detection module is adapted for detecting a pulse width of the current signal;

wherein input terminals of the gate driving module are respectively connected with an output terminal of the pulse width detection module and an output terminal of the delay restart module; an output terminal of the gate driving module serves as the output terminal of the logic control unit; and the gate driving module is adapted for generating and outputting the control signal according to the pulse width of the current signal or a restart signal; and wherein an input terminal of the delay restart module is connected with the positive output terminal of the bridge rectifier; and the delay restart module is adapted for determining according to a voltage value of the DC power, where, when the delay restart condition is met, the delay restart module is adapted for generating and outputting the restart signal.

11. A Light-Emitting Diode (LED) light source, comprising: a set of light emitting diodes, a driving device connected between an electronic ballast and the set of light emitting diodes, wherein the driving device comprises a circuit for driving the LED light source, wherein the circuit for driving the LED light source comprises a bridge rectifier, a switch unit, a current detection unit and a logic control unit;

wherein the circuit is connected between an electronic ballast and a set of light emitting diodes of the LED light source;

wherein an Alternating Current (AC) input terminal of the bridge rectifier is connected with the electronic ballast; a positive output terminal of the bridge rectifier is connected with an anode of the set of light emitting diodes; and the bridge rectifier is adapted for converting AC power to Direct Current (DC) power;

wherein the switch unit and the current detection unit are connected in series between a cathode of the set of light emitting diodes and a negative output terminal of the bridge rectifier; the switch unit is adapted for switching on or switching off a path according to a control signal, where the set of light emitting diodes is adapted for receiving the DC power from the path when the path is switched on; and the current detection unit is adapted for detecting a current signal flowing through the set of light emitting diodes; and wherein the logic control unit is connected between the positive output terminal and the negative output terminal of the bridge rectifier; an input terminal of the logic control unit is connected with the output terminal of the current detection unit; an output terminal of the logic control unit is connected with a control terminal of the switch unit; the logic control unit is adapted for generating a corresponding control signal according to the current signal, so as to control the switch unit to switch off the path; and the logic control unit is adapted for determining according to a voltage of the DC power, where when a delay restart condition is met, the logic control unit is adapted for generating a corresponding control signal, so as to control the switch unit to switch on the path.

12. The LED light source according to claim 11, further comprising:

a capacitor connected between the anode and the cathode of the set of light emitting diodes, wherein the capacitor is adapted for performing a filtering operation on the DC power; and a current regulation unit connected in series between the positive output terminal of the rectifier bridge and the set of light emitting diodes, wherein the current regulation unit is adapted for regulating the current flowing into the set of light emitting diodes in order to keep the current constant.

13. The LED light source according to claim 12, wherein the current regulation unit is a linear regulator or a switching-mode converter.

14. The LED light source according to claim 11, wherein the switch unit is a Metal-Oxide-Semiconductor Field-Effect Transistor (MOSFET), an Insulated Gate Bipolar Transistor (IGBT), a bipolar transistor or a relay.

15. The LED light source according to claim 11, wherein the current detection unit is a resistor, where a connection node of the resistor and the switch unit servers as the output terminal of the current detection unit.

16. The LED light source according to claim 11, wherein the logic control unit comprises: a low-pass filter, a current reference module, a compactor, a gate driving module and a delay restart module,
wherein an input terminal of the low-pass filter serves as the input terminal of the logic control unit; an output terminal of the low-pass filter is connected with a positive input terminal of the compactor; and the low-pass filter is adapted for performing a filter operation on the current signal flowing through the set of light emitting diodes, so as to obtain a filtered current signal;
wherein the current reference module is connected between a negative input terminal of the comparator and the negative output terminal of the bridge rectifier; the current reference module is adapted for outputting a current reference signal; and the comparator compares the filtered current signal with the current reference signal and outputs a comparison result;
wherein input terminals of the gate driving module are respectively connected with the output terminal of the comparator and the output terminal of the delay restart module; an output terminal of the gate driving module serves as the output terminal of the logic control unit; and the gate driving module is adapted for generating and outputting the control signal according to the comparison result and a restart signal; and
wherein an input terminal of the delay restart module is connected with the positive output terminal of the bridge rectifier; and the delay restart module is adapted for determining according to a voltage value of the DC power, where, when the delay restart condition is met, the delay restart module is adapted for generating and outputting the restart signal.

17. The LED light source according to claim 16, wherein the comparator is a hysteresis comparator.

18. The LED light source according to claim 11, wherein the logic control unit comprises: a peak detector, a current reference module, a compactor, a gate driving module and a delay restart module,
wherein an input terminal of the peak detector filter serves as the input terminal of the logic control unit; an output terminal of the peak detector is connected with a negative input terminal of the compactor; and the peak detector is adapted for detecting a peak value of the current signal flowing through the set of light emitting diodes;
wherein the current reference module is connected between a positive input terminal of the comparator and the negative output terminal of the bridge rectifier; the current reference module is adapted for outputting a current reference signal; and the comparator compares the peak value of the current signal with the current reference signal and outputs a comparison result;
wherein input terminals of the gate driving module are respectively connected with the output terminal of the comparator and the output terminal of the delay restart module; an output terminal of the gate driving module serves as the output terminal of the logic control unit; and the gate driving module is adapted for generating and outputting the control signal according to the comparison result and a restart signal; and
wherein an input terminal of the delay restart module is connected with the positive output terminal of the bridge rectifier; and the delay restart module is adapted for determining according to a voltage value of the DC power, where, when the delay restart condition is met, the delay restart module is adapted for generating and outputting the restart signal.

19. The LED light source according to claim 18, wherein the comparator is a hysteresis comparator.

20. The LED light source according to claim 11, wherein the logic control unit comprises: a pulse width detection module, a gate driving module and a delay restart module,
wherein an input terminal of the pulse width detection module serves as the input terminal of the logic control unit; and the pulse width detection module is adapted for detecting a pulse width of the current signal;
wherein input terminals of the gate driving module are respectively connected with an output terminal of the pulse width detection module and an output terminal of the delay restart module; an output terminal of the gate driving module serves as the output terminal of the logic control unit; and the gate driving module is adapted for generating and outputting the control signal according to the pulse width of the current signal or a restart signal; and
wherein an input terminal of the delay restart module is connected with the positive output terminal of the bridge rectifier; and the delay restart module is adapted for determining according to a voltage value of the DC power, where, when the delay restart condition is met, the delay restart module is adapted for generating and outputting the restart signal.

\* \* \* \* \*